United States Patent
Ramgopal

(10) Patent No.: US 11,323,273 B2
(45) Date of Patent: May 3, 2022

(54) SYSTEM AND METHOD FOR GENERATING A BLOCKCHAIN APPLICATION FOR DIFFERENT BLOCKCHAIN TECHNOLOGIES

(71) Applicant: Tata Consultancy Services Limited, Mumbai (IN)

(72) Inventor: Vivekanand Ramgopal, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 214 days.

(21) Appl. No.: 16/759,221

(22) PCT Filed: Oct. 24, 2018

(86) PCT No.: PCT/IB2018/058302
§ 371 (c)(1),
(2) Date: Apr. 24, 2020

(87) PCT Pub. No.: WO2019/082100
PCT Pub. Date: May 2, 2019

(65) Prior Publication Data
US 2020/0313904 A1  Oct. 1, 2020

(30) Foreign Application Priority Data

Oct. 24, 2017  (IN) .............................. 201721037607

(51) Int. Cl.
*H04L 29/06* (2006.01)
*H04L 9/32* (2006.01)
*G06F 21/60* (2013.01)

(52) U.S. Cl.
CPC .......... *H04L 9/3263* (2013.01); *G06F 21/602* (2013.01); *H04L 2209/38* (2013.01)

(58) Field of Classification Search
None
See application file for complete search history.

(56) References Cited

U.S. PATENT DOCUMENTS 11,196,543 B2 * 12/2021 Irazabal ................ H04L 9/3218
2016/0292672 A1   10/2016 Fay et al.
(Continued)

FOREIGN PATENT DOCUMENTS

WO   WO-2017/161417        9/2017
WO   WO-2017161417 A1 *    9/2017   .......... G06F 9/45512

OTHER PUBLICATIONS

International Search Report and Written Opinion dated Mar. 6, 2019, in International Application No. PCT/IB2018/058302; 6 pages.

*Primary Examiner* — Jeremy S Duffield
*Assistant Examiner* — Hassan A Hussein
(74) *Attorney, Agent, or Firm* — Finnegan, Henderson, Farabow, Garrett & Dunner, LLP

(57) ABSTRACT

This relates generally to a system and method to generate a blockchain application for different blockchain technologies. The system provides a blockchain development framework that allows business application (i.e., logic) to be written once irrespective of underlying blockchain technologies. The blockchain development framework works in two stages. In the first stage, a user interface is provided to capture the metadata and a set of functions. Further, the blockchain development framework generates underlying blockchain technology specific code in the second stage. The user can write business logics for the business use case in a platform agnostic programming language. The smart contract can then be compiled and deployed on the underlying blockchain platform specified by the user. This enables easy portability among blockchain technologies and thus reduces human intervention while programming.

10 Claims, 3 Drawing Sheets

(56) References Cited

U.S. PATENT DOCUMENTS

| | | |
|---|---|---|
| 2017/0155515 A1 | 6/2017 | Androulaki et al. |
| 2017/0232300 A1* | 8/2017 | Tran ................ H04L 67/10 434/247 |
| 2017/0264428 A1 | 9/2017 | Seger, II |
| 2017/0287090 A1* | 10/2017 | Hunn ................ H04L 9/0643 |
| 2017/0301047 A1 | 10/2017 | Brown et al. |
| 2019/0026716 A1* | 1/2019 | Anbukkarasu ....... G06Q 20/389 |
| 2019/0036778 A1* | 1/2019 | Bathen ............ H04L 41/0893 |
| 2019/0109866 A1* | 4/2019 | Lokamathe ......... H04L 63/126 |
| 2019/0138384 A1* | 5/2019 | Nair ................. G06F 16/27 |
| 2021/0004774 A1* | 1/2021 | Ramgopal ........... G06Q 40/04 |
| 2021/0232571 A1* | 7/2021 | Singh Dilip Thakur ............ G06F 21/57 |
| 2021/0255993 A1* | 8/2021 | Sarkar ................ G06F 16/16 |
| 2021/0385065 A1* | 12/2021 | Syed ................ H04L 9/0637 |

\* cited by examiner

SYSTEM AND METHOD FOR GENERATING A BLOCKCHAIN APPLICATION FOR DIFFERENT BLOCKCHAIN TECHNOLOGIES

PRIORITY

This application is a U.S. National Stage Filing under 35 U.S.C. § 371 and claims priority from International Application No. PCT/162018/058302, filed on Oct. 24, 2018, which application claims priority under 35 U.S.C. § 119 from Indian Provisional Patent Application No. 201721037607, filed on Oct. 24, 2017, the entirety of which is hereby incorporated by reference.

TECHNICAL FIELD

The disclosure herein generally relates to a field of blockchain technology and, more particularly, to generate a blockchain development framework for different blockchain technologies.

BACKGROUND

In recent years, blockchain technology or distributed ledger technology (DLT) is a continuously evolving in various ways. New platforms and versions of DLT frameworks are entering the arena with new features. Business today has many use cases which can advantage of the new features which DLT has to offer.

One such feature of DLT which has attracted lot of attention is the capability to program the DLT framework i.e., use of smart contracts. The smart contracts let the business implement a large use case as a single programmable entity or as a collection of entities. But as the technology is still young, businesses like to see the same use cases implemented in different DLT technologies so that they can evaluate them better and choose the one which suites them the best. However, the existing methods implement the same use cases multiple times for each DLT Platform. For example, blockchain applications are currently built as a specific solution that works with a specific underlying blockchain technology. Hence, portability from one technology to another technology may require programming and duplication of efforts and thereby human intervention.

SUMMARY

Embodiments of the present disclosure provides technological improvements as solutions to one or more of the above-mentioned technical problems recognized by the inventors in conventional systems. For example, in one embodiment, a system and method to generate a blockchain development framework for different blockchain technologies.

In one embodiment, a system is configured to generate a blockchain development framework for different blockchain technologies. The system comprising at least one memory storing a plurality of instructions and one or more hardware processors communicatively coupled with the at least one memory. The one or more hardware processors are configured to execute one or more modules. A receiving module of the system is configured to receive a plurality of instructions from a user, wherein the plurality of the instructions include a set of business rules and a definition of metadata for a blockchain application, an analyzing module is configured to analyze the received plurality of instructions to select a factory design pattern based on a technology specific template and the metadata depending on the target DLT platform, a blockchain application generator is configured to generate a smart contract code based on the selected factory design pattern based technology specific template, the metadata and a security aspect for the target DLT platform, wherein the security aspect including a certificate of authority implementation associated with the target blockchain technology and a deployment module configured to deploy the generated smart contract code based on the selected technology specific template and the definition of metadata.

In another embodiment, a processor-implemented method to generate a blockchain development framework for different blockchain technologies. The method comprising one or more steps as receiving a plurality of instructions from a user, wherein the plurality of the instructions include a set of business rules and a definition of metadata for a blockchain application, analyzing the received plurality of instructions to select a factory design pattern based on a technology specific template and the definition of metadata depending on the target DLT platform, generating based on the selected factory design pattern based technology specific template, the metadata and a security aspect for the target DLT platform, wherein the security aspect including a certificate of authority implementation associated with the target blockchain technology, and deploying the generated smart contract code based on the selected technology specific template and the definition of metadata.

In yet another embodiment, a non-transitory computer readable medium storing one or more instructions which when executed by a processor on a system, cause the processor to perform a processor-implemented method. Wherein, the processor-implemented method to generate a blockchain development framework for different blockchain technologies. The method comprising one or more steps as receiving a plurality of instructions from a user, wherein the plurality of the instructions include a set of business rules and a definition of metadata for a blockchain application, analyzing the received plurality of instructions to select a factory design pattern based on a technology specific template and the definition of metadata depending on the target DLT platform, generating based on the selected factory design pattern based technology specific template, the metadata and a security aspect for the target DLT platform, wherein the security aspect including a certificate of authority implementation associated with the target blockchain technology, and deploying the generated smart contract code based on the selected technology specific template and the definition of metadata.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide a method and a system to generate a blockchain application for different blockchain technologies. It would be appreciated that the system described herein, comprising one or more modules to generate a blockchain application suitable for different blockchain technologies or distributed ledger technologies (DLT). Further, the system provides a blockchain development framework that allows business application (i.e., logic) to be written once irrespective of underlying blockchain technologies. Further, the framework generates underlying blockchain technology specific code thus reducing human intervention while programing.

The blockchain development framework facilitates generation of underlying code for multiple target platforms. It enables users to develop smart contracts independent of the underlying blockchain platform used to deploy them, thereby providing flexibility and platform independence to the user. Further, the blockchain development framework enables developers with limited or no platform specific know-how to code the business logic for the blockchain in a platform neutral way.

Figure 1:
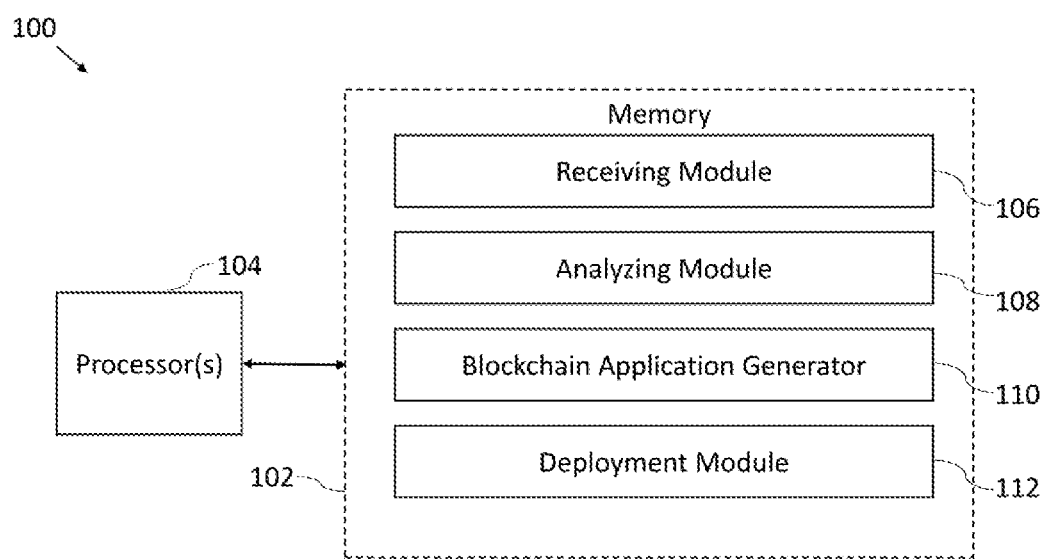
FIG. 1 illustrates a system for a blockchain development framework, in accordance with some embodiments of the present disclosure.
Figure 2:
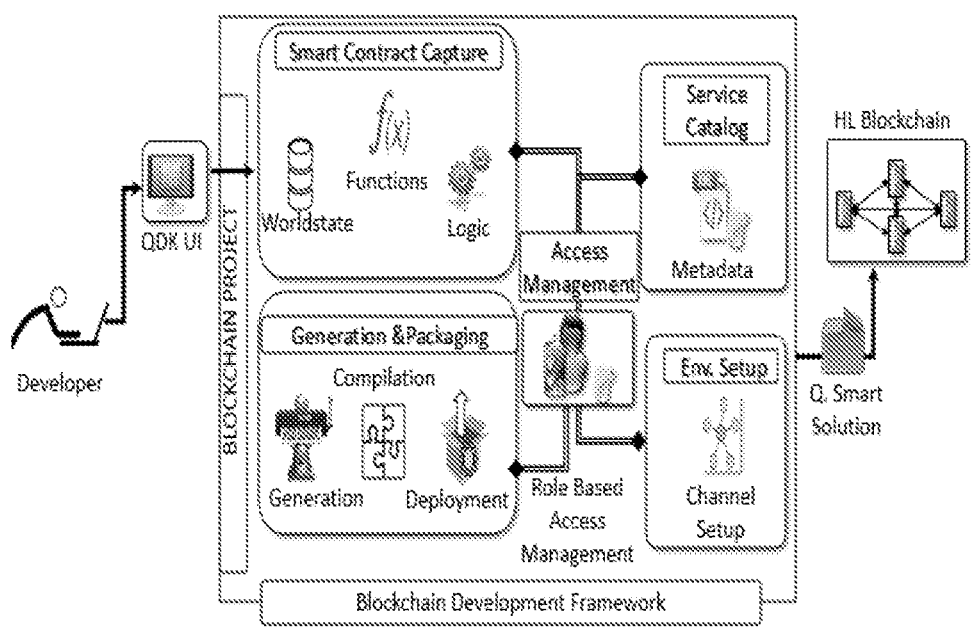
FIG. 2 illustrates an architecture of the blockchain development framework, in accordance with some embodiments of the present disclosure.
Figure 3:
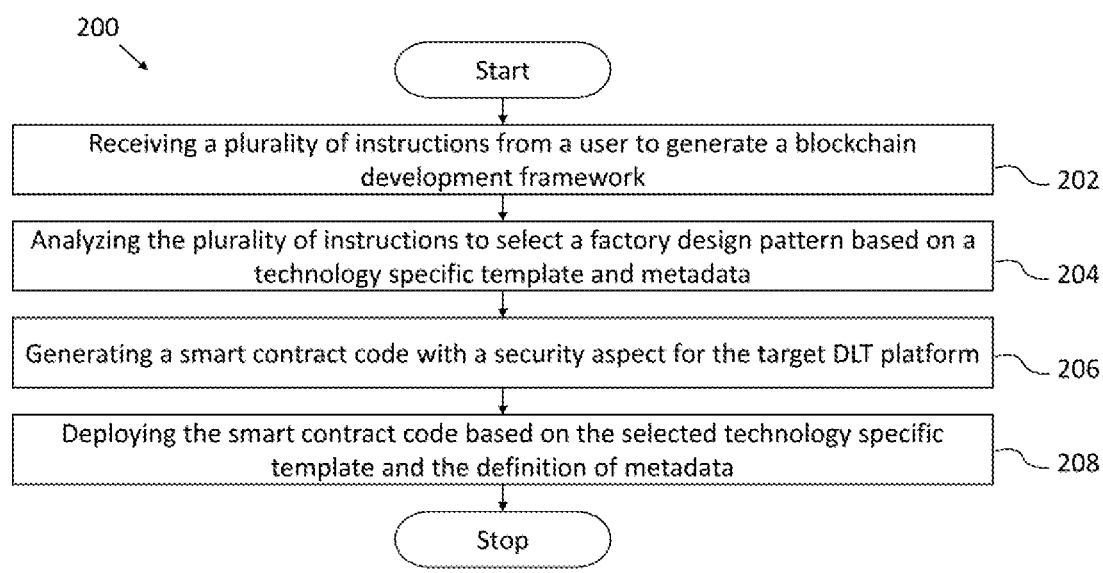
FIG. 3 is a flow diagram to illustrate a method to generate a blockchain development framework, in accordance with some embodiments of the present disclosure.

Referring now to the drawings, and more particularly to FIG. 1 through FIG. 3, where similar reference characters denote corresponding features consistently throughout the figures, there are shown preferred embodiments and these embodiments are described in the context of the following exemplary system and/or method. It would be appreciated that the one or more aspects of described methods and systems for generating the blockchain application can be implemented in any number of different systems, utility environments, and/or configurations, the embodiments are described in the context of the following exemplary system(s).

FIG. 1 illustrates a system to generate a blockchain development framework for different blockchain technologies, according to some embodiments of the present disclosure. The system (100) comprises at least one memory (102) with a plurality of instructions and one or more hardware processors (104) which are communicatively coupled with the at least one memory (104) to execute modules therein. Further, the system comprises a receiving module (106), an analyzing module (108), a blockchain application generator (110), and a deployment module (112).

The hardware processor (104) may be implemented as one or more microprocessors, microcomputers, microcontrollers, digital signal processors, central processing units, state machines, logic circuitries, and/or any devices that manipulate signals based on operational instructions. Among other capabilities, the hardware processor (104) is configured to fetch and execute computer-readable instructions stored in the memory (102).

In the preferred embodiment of the disclosure, a receiving module (106) of the system (100) is configured to receive a plurality of instructions from a user, wherein the plurality of the instructions include a set of business rules and a definition of metadata for a blockchain application. It should be appreciated that the definition of metadata comprises of a set of ledger objects, relations and functions among them.

Referring FIG. 2, illustrating that the blockchain development framework works in two stages. In the stage 1, the user interface is provided to a user to submit the metadata and a set of functions. The metadata comprising a set of world state objects, one or more rules associated with the set of world state objects, a plurality of functions to perform at least one operation on the world state objects. It is to be noted that the set of world state objects are data structures that represents the data to be stored on the ledger. In the second stage, a smart contract code is generated based on the plurality of functions and the identified metadata. It should be appreciated that the user can write business logics for the business use case in a platform agnostic programming language. The smart contract can then be compiled and deployed on underlying blockchain platform specified by the user.

In the preferred embodiment of the disclosure, the analyzing module (108) of the system (100) is configured to analyze the received plurality of instructions to select a factory design pattern based on a technology specific template and the metadata depending on the target DLT platform. The analyzing module (108) identifies the business logic to the respective blockchain code based on the chosen underlying blockchain technology and also deploys the object code. The analysis enables to select a factory design pattern based technology specific template and the metadata depending on the target DLT platform.

The blockchain development framework provides a separation of the business layer and the technology layer. The evolution of the technology layer and a switch to different blockchain technologies if required in the future can be handled by the tool set, thereby protecting the investments made on the business solution.

In the preferred embodiment of the disclosure, the blockchain application generator (110) of the system (100) is configured to generate a smart contract code based on the selected factory design pattern based technology specific template, the metadata and a security aspect for the target DLT platform, wherein the security aspect including a certificate of authority implementation associated with the target blockchain technology.

It would be appreciated that the security aspects for the target DLT platform refer to specification of permissions associated with the deployment and invocation of the smart contract code for the target DLT platform. This ensures that only users with the required permissions would be able to invoke and deploy smart contracts in the target DLT platform.

The factory design pattern is a pattern which enables template based approach for each blockchain platform. The system (100) is configured to create a template that would be factored in by the blockchain application generator when it consumes a smart contract solution through the blockchain development framework and delivers the generated smart contract code as per the target platform of choice.

The smart contract is an executable software that is stored in the platform and triggered either as a result of specific events occurring outside the platform, or as a result of pre-configured rules that are programmed into these contracts. The set of protocols comprises of a set of rules that a blockchain platform follows when it interacts by means of gateway with another blockchain platform independent of the first blockchain platform, or with the traditional messaging network.

In the preferred embodiment of the disclosure, the deployment module (112) of the system (100) is configured to deploy the generated smart contract code based on the selected technology specific template and the definition of metadata.

In another aspect, the system (100) is configured to capture metadata and business logic in a generic Manner. Further, it provides a built-in repository of factory design pattern based, DLT platform specific templates. Also enables selection of appropriate templates and populate the metadata depending on a target DLT platform. The system (100) also provides capability to translate the business logic to suit the target platform.

It should be noted that the smart contracts can be written, compiled, deployed and executed in different manner on different DL platforms.

Referring FIG. 3, a processor-implemented method (200) to generate a blockchain development framework for different blockchain technologies, according to some embodiments of the present disclosure. The method comprises one or more steps as follows.

Initially, at the step (202), receiving a plurality of instructions from a user at a receiving module (106) of the system (100), wherein the plurality of instructions includes a set of business rules and a definition of metadata for a blockchain application.

In the preferred embodiment of the disclosure, at the next step (204), analyzing the received plurality of instructions at an analyzing module (108) of the system (100) to select a factory design pattern based technology specific template and the definition of metadata depending on the target DLT platform.

In the preferred embodiment of the disclosure, at the next step (206), generating a smart contract code based on the selected factory design pattern based technology specific template, the metadata and by considering an encryption method at a blockchain application generator (110) of the system (100).

In the preferred embodiment of the disclosure, at the last step (208), deploying the smart contract code based on the selected technology specific template and the metadata at a deployment module (112) of the system (100).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of portability from one technology to another technology which may require programming and duplication of efforts and thereby human intervention. The embodiments of present disclosure provide a system and method to generate a blockchain development framework for different blockchain technologies. The system and method provide a blockchain development framework that allows business application (i.e., logic) to be written once irrespective of underlying blockchain technologies. Further, the framework generates underlying blockchain technology specific code thus reducing human intervention while programing.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

I claim:

1. A system for a blockchain development framework, wherein the system comprising: at least one memory storing a plurality of instructions; one or more hardware processors communicatively coupled with the at least one memory, wherein the one or more hardware processors are configured to execute one or more modules; a receiving module, stored in the at least one memory, configured to receive the plurality of instructions from a user, wherein the plurality of the instructions includes a set of business rules and a definition of metadata for a target distributed ledger technology (DLT) platform; an analyzing module, stored in the at least one memory, configured to analyze the received plurality of instructions to select a factory design pattern based on a technology specific template and the definition of metadata depending on the target DLT platform; a blockchain application generator, stored in the at least one memory, configured to generate a smart contract code based on the selected factory design pattern based technology specific template, the definition of metadata and a security aspect for the target distributed ledger technology (DLT) platform, wherein the security aspect including a certificate of authority implementation associated with a target blockchain technology; and a deployment module, stored in the at least one memory, configured to deploy the generated smart contract code based on the selected technology specific template and the definition of metadata.

2. The system claimed in claim 1, wherein the selected factory design pattern specifies a pattern for the selected template for the target distributed ledger technology (DLT) platform.

3. The system claimed in claim 1, wherein the security aspect specifies permissions associated with the deployment and invocation of the generated smart contract code for the target distributed ledger technology (DLT) platform.

4. The system claimed in claim 1, wherein the definition of metadata comprises of a set of ledger objects, relations and functions among them.

5. A processor-implemented method for a blockchain development framework, the method comprising one or more steps of: receiving a plurality of instructions from a user, wherein the plurality of the instructions includes a set of business rules and a definition of metadata for a target distributed ledger technology (DLT) platform; analyzing the received plurality of instructions to select a factory design pattern based on a technology specific template and the definition of metadata depending on the target DLT platform; generating a smart contract code based on the selected factory design pattern, the definition of metadata, and a security aspect for the target DLT platform, wherein the security, aspect including a certificate of authority implementation associated with a target blockchain technology; and deploying the generated smart contract code based on the selected technology specific template and the definition of metadata.

6. The method claimed in claim 5, wherein the selected factory design pattern specifies a pattern to enable the selected technology specific template for the target distributed ledger technology (DLT) platform.

7. The method claimed in claim 5, wherein the generation of smart contract comprises one or more steps of: selecting the target distributed ledger technology (DLT) platform and running the compilation process to check for any compilation error; and considering the security aspects including certificate of authority implementation associated with the target blockchain technology.

8. The method claimed in claim 5, wherein the security aspect specifies permissions associated with the deployment and invocation of the generated smart contract code for the target distributed ledger technology (DLT) platform.

9. The method claimed in claim 5, wherein the definition of metadata comprises of a set of ledger objects, relations and functions among them.

10. A non-transitory computer readable medium storing one or more instructions which when executed by a processor on a system, cause the processor to perform method comprising: receiving a plurality of instructions from a user, wherein the plurality of the instructions includes a set of business rules and a definition of metadata for a target distributed ledger technology (DLT) platform; analyzing the received plurality of instructions to select a factory design pattern based on a technology specific template and the definition of metadata depending on the target distributed ledger technology (DLT) platform; generating a smart contract code based on the selected factory design pattern, the definition of metadata, and a security aspect for the target distributed ledger technology (DLT) platform, wherein the security aspect including a certificate of authority implementation associated with a target blockchain technology; and deploying the generated smart contract code based on the selected technology specific template and the definition of metadata.

* * * * *